US010283139B2

(12) United States Patent
Elko et al.

(10) Patent No.: US 10,283,139 B2
(45) Date of Patent: May 7, 2019

(54) REVERBERATION SUPPRESSION USING MULTIPLE BEAMFORMERS

(71) Applicant: mh Acoustics, LLC, Summit, NJ (US)

(72) Inventors: Gary W. Elko, Summit, NJ (US); Eric J. Diethorn, Long Valley, NJ (US); Steven Backer, Oakland, CA (US); Jens M. Meyer, Fairfax, VT (US); Tomas F. Gaensler, Warren, NJ (US)

(73) Assignee: MH Acoustics, LLC, Summit, NJ (US)

( * ) Notice: Subject to any disclaimer, the term of this patent is extended or adjusted under 35 U.S.C. 154(b) by 0 days.

(21) Appl. No.: 15/542,008

(22) PCT Filed: Jan. 8, 2016

(86) PCT No.: PCT/US2016/012609
§ 371 (c)(1),
(2) Date: Jul. 6, 2017

(87) PCT Pub. No.: WO2016/114988
PCT Pub. Date: Jul. 21, 2016

(65) Prior Publication Data

US 2018/0277137 A1 Sep. 27, 2018

Related U.S. Application Data

(60) Provisional application No. 62/102,132, filed on Jan. 12, 2015.

(51) Int. Cl.
*G10L 21/0232* (2013.01)
*G10L 21/0208* (2013.01)
(Continued)

(52) U.S. Cl.
CPC ...... *G10L 21/0232* (2013.01); *G10L 21/0208* (2013.01); *H04R 1/406* (2013.01);
(Continued)

(58) Field of Classification Search
CPC ....... G10L 21/0232; G10L 2021/02082; G10L 2021/02166; H04R 1/406; H04R 3/005; H04R 2201/403; H04R 2430/03
See application file for complete search history.

(56) References Cited

U.S. PATENT DOCUMENTS 3,180,936 A 4/1965 Schroeder
3,403,224 A 9/1968 Schroeder
(Continued)

OTHER PUBLICATIONS

European Office Action; dated Apr. 16, 2018 for EP Application No. 16713132.5.
(Continued)

*Primary Examiner* — Ping Lee
(74) *Attorney, Agent, or Firm* — Mendelsohn Dunleavy, P.C.; Steve Mendelsohn

(57) ABSTRACT

In one embodiment, an audio processing system reduces reverberation in an audio signal. A first beamformer generates a first, directional beampattern, and a second beamformer generates a second beampattern. A signal-processing subsystem (i) processes the first and second beampatterns to generate suppression factors corresponding to the reverberation and (ii) applies the suppression factors to one of the first and second beampatterns to reduce the reverberation in the beampattern. In one implementation, the beampatterns are crossed-beam beampatterns, and the signal-processing subsystem generates the suppression factors based on coherence estimates for the beampatterns. In another implementation, the beampatterns are disjoint beampatterns, and the signal-processing subsystem generates the suppression factors based on short-time and long-time envelope estimates for the beampatterns. Depending on the implementation, the beamformers may be co-located with differently shaped beampatterns or non-co-located with differently or equally shaped beampatterns.

9 Claims, 6 Drawing Sheets

(51) Int. Cl.

| | |
|---|---|
| ***G10L 21/0216*** | (2013.01) |
| ***G10L 21/0264*** | (2013.01) |
| ***H04R 3/00*** | (2006.01) |
| ***H04R 1/40*** | (2006.01) |

(52) U.S. Cl.

CPC .......... *H04R 3/005* (2013.01); *G10L 21/0264* (2013.01); *G10L 2021/02082* (2013.01); *G10L 2021/02165* (2013.01); *G10L 2021/02166* (2013.01); *H04R 2201/403* (2013.01); *H04R 2410/01* (2013.01); *H04R 2410/05* (2013.01); *H04R 2430/03* (2013.01)

(56) References Cited

U.S. PATENT DOCUMENTS

2002/0193130 A1 12/2002 Yang et al.
2008/0260175 A1 10/2008 Elko
2013/0258813 A1 10/2013 Herre et al.
2014/0010373 A1* 1/2014 Gran ...................... H04R 25/50 381/23.1
2014/0177857 A1 6/2014 Kuster
2014/0270216 A1* 9/2014 Tsilfidis ................ H04M 9/082 381/66
2016/0157030 A1* 6/2016 Odame ................ H04R 25/407 381/313

OTHER PUBLICATIONS

Le Bouquin, R. et al., "Study of a Noise Cancellation System Based on the Coherence Function", Signal Processing Theories and Applications, Proceedings of the European Signal Processing Conference, EUSIPCO, 1992, vol. 3, pp. 1633-1636.
E. J. Diethom, "Subband noise reduction methods for speech enhancement," in Acoustic Signal Processing for Telecommunication, Gay S.L., Benesty J. (eds), 2000, pp. 155-178.
Diethorn, E J., "Foundations of spectral-gain formulae for speech noise reduction," in Proc. International Workshop on Acoustic Echo and Noise Control (IWAENC), 2005, pp. 181-184.
Boll, S. F., "Suppression of Acoustic Noise in Speech Using Spectral Subtraction," IEEE Trans. Acoust., Speech, Signal Proc., 1979, vol. ASSP-27, No. 2, pp. 113-120.
International Search Report and Written Opinion dated Sep. 28, 2016 for PCT Application No. PCT/US2016/012609 (18 pages).

* cited by examiner

400

1100

REVERBERATION SUPPRESSION USING MULTIPLE BEAMFORMERS

CROSS-REFERENCE TO RELATED APPLICATIONS

This application claims the benefit of the filing date of U.S. provisional application No. 62/102,132, filed on Jan. 12, 2015, the teachings of which are incorporated herein by reference in their entirety.

BACKGROUND

Field of the Invention

The present invention relates to audio signal processing and, more specifically, to the suppression of reverberation noise.

Description of the Related Art

This section introduces aspects that may help facilitate a better understanding of the invention. Accordingly, the statements of this section are to be read in this light and are not to be understood as admissions about what is prior art or what is not prior art.

Hands-free audio communication systems that are designed to allow audio and speech communication between remote parties are known to be sensitive to room reverberation and noise, especially when the sound source is distant from the microphone. One solution to this problem is to use a single array of microphones to spatially filter the acoustic field so that substantially only the direct sound field from the talker is picked up and transmitted. It is well known that the maximum directional gain $Q_{max}$ attainable by a linear microphone array in a diffuse sound field is given by Equation (1) as follows:

$$Q_{max}=20\log_{10}(N), \quad (1)$$

where N is the number of microphones. This maximum microphone array directional gain is attainable only with specific microphone geometries. The gain of typical realizable microphone arrays is significantly lower than this maximum.

FIG. 1 is a graphical representation of the maximum gain 102 of the ideal microphone array of Equation (1) compared with the typical gain 104 of a realizable microphone array in a diffuse noise field as a function of the number of microphone elements. The typical gain $Q_{typ}$ in a diffuse field for a filter-sum beamformer occurs when spacing between adjacent microphones is one half of the wavelength and is $Q_{typ}=10\log_{10}(N)$. The gains are even lower when the spacing is less than one half of the wavelength. To increase the direct-to-reverberant ratio in a diffuse field by 20 dB, one would need approximately 100 microphones. Thus, a very large number of microphones in an array would be required to significantly reduce long-term room reverberation, thereby making this solution potentially overly expensive and unwieldy.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 3A represents an example of a beamformer configuration for a crossed-beam reverberation suppression technique, while

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms “a,” “an,” and “the,” are intended to include the plural forms as well, unless the context clearly indicates otherwise. It further will be understood that the terms “comprises,” “comprising,” “includes,” and/or “including,” specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
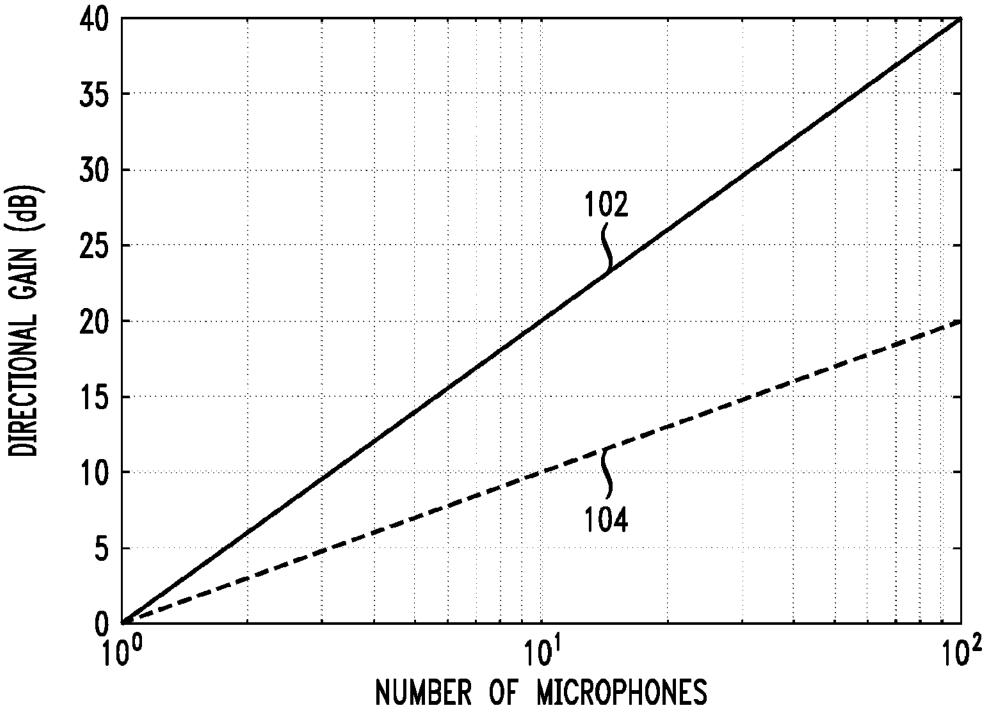
FIG. 1 is a graphical representation of the maximum gain for an ideal linear microphone array compared with the typical gain for a realizable microphone array in a diffuse noise field as a function of the number of microphone elements.

This disclosure presents two techniques that attempt to address the rather slow growth in directional gain possible by linear processing as a function of the number of microphones in a single linear microphone array as represented in FIG. 1. A possible approach to attain higher directive gain is to replace standard linear processing with some form of nonlinear multiplicative processing.

Two different processing techniques are described herein that both utilize the outputs of at least two beamformers to implement a reverberation-tail suppression algorithm. The first technique relies on the estimation of a short-time coherence function and exploits an innate bias to this technique to suppress long-term reverberation between two overlapping beams. The second technique uses at least two beamformers, where a main beamformer is steered towards the desired source and a secondary beamformer is steered away from the desired source.

In both techniques, a dynamic suppression scheme is implemented where it is assumed that the long-term reverberation is similar between the two beamformers but very different for the direct path from the desired source to each beamformer. Both techniques are essentially suppression techniques that attempt to effectively exploit the time-varying, highly transient, and nonstationary nature of speech so that these rapid changes that are in the direct path are allowed through the processing algorithm but slower-changing, longer-time reverberant signals are attenuated.

Figure 2:
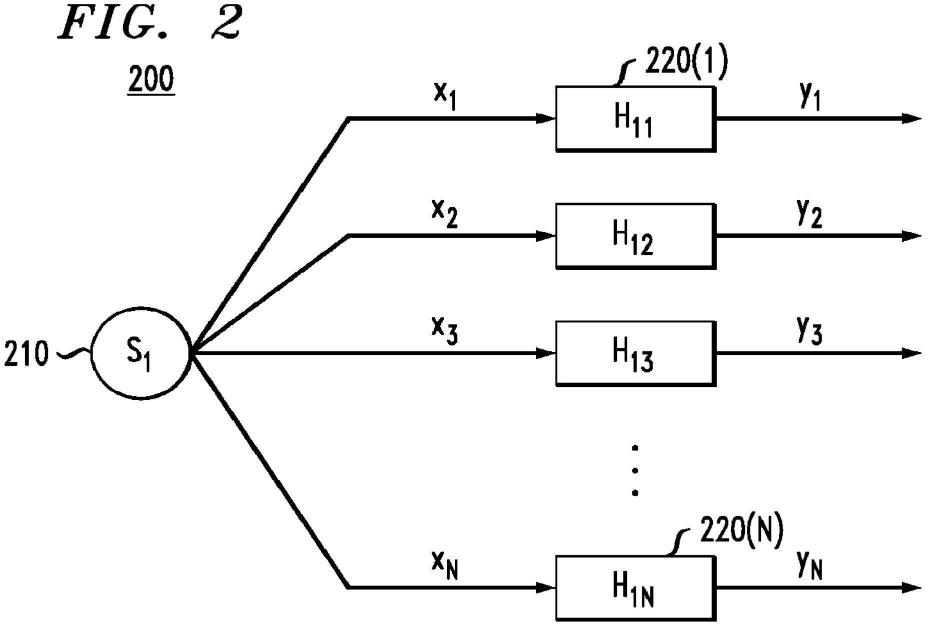
FIG. 2 is a block diagram of an environment having a single sound source and N filter-sum beamformers.

FIG. 2 is a block diagram of an environment 200 having a single sound source 210 and N filter-sum beamformers 220(1)-220(N). The source 210 has a path transfer function vector $x_i$ that defines the acoustic signal (i.e., sound) input to the corresponding beamformer 220(*i*), which produces an audio signal (i.e., electronic) output vector $y_i$ according to Equation (2) as follows:

$$y_i = H_{1i} * x_i, \tag{2}$$

where $H_{1i}$ is the filter-sum transfer matrix for the beamformer 220(*i*), and $x_i$ is a vector of input source signals. Each beamformer 220 includes an audio signal generator (not shown) that converts acoustic signals into audio signals as well as a filter-sum signal-processing subsystem (not shown) that converts the resulting audio signals into a beamformer output signal corresponding to corresponding beampattern.

The audio signal generator for each beamformer 220 comprises one or more acousto-electronic transducers (e.g., microphone elements) that convert acoustic signals into audio signals. The type of audio signal generator may vary from beamformer to beamformer. As such, the length of the input vector $x_i$ (i.e., the number of audio signal inputs) and the number of filter taps in the corresponding filter-sum beamformer 220(*i*) can vary from beamformer to beamformer. In some embodiments, each beamformer 220 has a microphone array, such as, but not limited to, a linear microphone array, comprising a plurality of microphone elements. Depending on the particular implementation, different beamformers 220 can share one or more microphone elements or be separate and distinct arrays.

Since all of the beamformer outputs $y_i$ are linearly related to the source signal, the coherence between the source and any beamformer output signal is unity and independent of the actual room transfer functions. The coherence between any beamformer output pair ($y_i$, $y_j$), $i \neq j$, is also unity since again these signals are linearly related through a transfer function.

From the previous discussion, one important question is: How can the coherence function between any number of beamformers be utilized to reduce room reverberation and noise for single or multiple sources if the coherence function is unity between all beamformer outputs? One possible answer to this question is based on exploiting the long-term statistics of sound-source signals in conjunction with inherent bias in the estimation of the short-time coherence function. The undesired effects of room reverberation in communication systems and in speech recognition systems are due to the relatively long decay rate of the reverberation compared to the hearing perception rates or the block processing size (typically 10 to 20 msec), respectively. Once the direct sound impinges on a listener's ear, later reverberation due to reflections of the sound off the room boundaries can become disturbing to the listener or the speech recognition system. Reflections and reverberation arriving after 40 milliseconds are perceived as discreet echoes. It is well known that signals with reflection and/or reverberation delays on this order lower human intelligibility and increase the Word-Error-Rate (WER) in speech recognition systems.

A well-known model of room reverberation is that of a diffuse sound field. This pedagogical model assumes that late-time reverberation is similar in spatial statistics to one that would be obtained from having an infinite number of independent, uniformly spatially distributed sources of equal power. As part of this assumed model, it can be concluded that the correlation between the late time reverberation is small compared to the direct early sound. An implicit assumption in the diffuse-field model is that the autocorrelation of the source decreases as the time lag increases. Thus, in a statistical sense, the diffuse-field model assumes that the source correlation length is much shorter than the reverberation process length, which in practice is a reasonable assumption with time-varying systems and time-varying wideband signals like speech. It is therefore plausible that late-time room reverberation is uncorrelated with the direct sound and also between beamformers that spatially filter the late-time room reverberation into regions with little spatial overlap. Thus, one possible technique that could be used to reduce late-time room reverberation is to use directional beamformers that spatially filter the reverberation into outputs where the late-time room reverberation is essentially uncorrelated for sources whose autocorrelation functions sufficiently decrease with time lag.

The first technique discussed above, which is referred to herein as crossed-beam reverberation suppression, involves beamforming processing that uses at least two beamformers, at least one of which is a directional beamformer, and subsequent signal processing based on the estimated short-time coherence between the resulting beampatterns, where each beamformer has either a different response or a different spatial position or both, but where the beamformers have overlapping responses at the location of the desired source.

The second technique, referred to herein as disjoint-beam reverberation suppression, also uses at least two beamformers, at least one of which is a directional beamformer, but uses a suppression scheme that exploits the property that long-term room reverberation decay is similar for any beamformer in the same room. (Of course, it is possible to imagine rooms that would violate this property, but, for a typical room where sound absorption is relatively uniformly distributed, this property is a reasonable assumption.) In this technique, a main beamformer is directed at the desired source. This source-directed beamformer would have a short-time envelope output that should be similar to the source envelope due to the increase in the direct path by spatial filtering of the beamformer. A secondary beamformer is directed away from the desired source. The output from the secondary beamformer would have a similar long-term reverberation decay response as the main, source-directed beamformer. By utilizing the difference in dynamic envelopes between the two oriented beamformers, it is possible to develop a dynamic suppression algorithm that "squelches" longer-term reverberation by effectively suppressing the reverberant tails in the source-directed beamformer. This scheme operates like a dual-channel noise suppressor where the secondary beamformer is estimating the "noise" in the main, source-directed beamformer output.

Figure 3A:
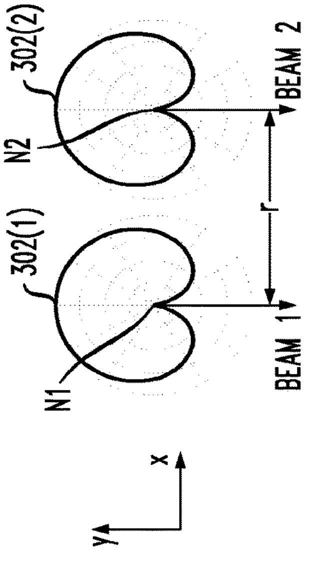
Figure 3B:
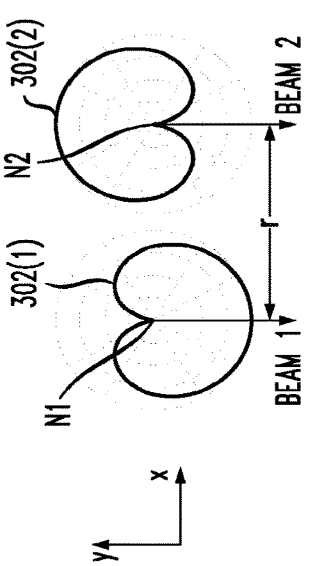
FIG. 3B represents an example of a beamformer configuration for a disjoint-beam reverberation suppression technique.

FIG. 3A represents an example of a beamformer configuration for the crossed-beam reverberation suppression technique, while FIG. 3B represents an example of a beamformer configuration for the disjoint-beam reverberation suppression technique. Both configurations employ two spatially separated (by distance r), parallel, first-order cardioid beampatterns 302(1) and 302(2) where the nulls N1 and N2 are pointing in either the same or opposite directions. For FIG. 3A, where both nulls N1 and N2 are pointing in the same direction, the desired source direction would ideally be in the 90-degree or positive y-axis direction. For FIG. 3B, where the nulls N1 and N2 are pointing in opposite directions and where Beam 1 is the main beam, the desired source direction would ideally be in the positive y-axis direction.

Speech is a common signal for communication systems. As mentioned previously, speech is a highly transient source, and it is this fundamental property that can be exploited to suppress reverberation in a distant-talking scenario. Room reverberation is a process that decays over time. The direct path of speech contains transients that burst up over the reverberant decay of previous speech. Any processing scheme that is designed to exploit the transient quality of speech is of potential interest. If a processing function can be devised that (i) gates on the dynamic time-varying processing to allow only the transient bursts and (ii) suppresses longer-term reverberation, then this might be a useful tool for reverberation suppression.

Crossed-Beam Reverberation Suppression

This section describes the crossed-beam reverberation suppression technique, which uses the short-time coherence function between beamformers as the underlying method for the gating and reverberation suppression mechanism, since coherence can be a normalized and bounded measure that is based on the expectation of the product of the beamformer outputs. Ideally, there is a steady-state transfer function between a single sound source (e.g., a person speaking) and the outputs of multiple beamformers in a steady-state time-invariant room with no noise.

In general, two beamformers are said to be crossed-beam beamformers if they have either two different responses (i.e., beampatterns) or two different spatial positions or both, but with overlapping responses at the location of a desired source. One example of crossed-beam beamformers is a first, directional beamformer with its primary lobe oriented towards the desired source and a second, directional beamformer spatially separated from the first beamformer and whose primary lobe is also oriented towards the desired source. In one possible implementation, the first, directional beamformer comprises a linear microphone array as its audio signal generator, and the second, directional beamformer comprises a second linear microphone array as its audio signal generator, where the second linear microphone array is spatially separated from and oriented orthogonal to the first linear microphone array.

Another example of crossed-beam beamformers is a first, directional beamformer with its primary lobe oriented towards the desired source and a second, omnidirectional beamformer spatially separated from the first beamformer and whose beampattern necessarily includes the desired source. In one possible implementation, the first, directional beamformer comprises a linear microphone array as its audio signal generator, while the second, directional beamformer comprises a single omni microphone as its audio signal generator, where the second linear microphone array is spatially separated from the omni microphone.

Yet another example of crossed-beam beamformers is a first, directional beamformer with its primary lobe oriented towards the desired source and a second, directional beamformer co-located with the first beamformer but having a different beampattern that also has its primary lobe oriented towards the desired source. In one possible implementation, the first, directional beamformer comprises a linear microphone array as its audio signal generator, and the second, directional beamformer comprises a second linear microphone array as its audio signal generator, where (i) the center of the second linear microphone array is co-located with the center of the first linear microphone array and (ii) the two linear arrays are orthogonally oriented in a "+" sign configuration. In this implementation, the two linear arrays might even share the same center microphone element.

In another possible implementation of this example of crossed-beam beamformers, the first, directional beamformer comprises a first linear microphone array as its audio signal generator, while the second, directional beamformer uses a subset of the microphone elements of the first linear array as its audio signal generator, where the center of the subset coincides with the center of the first linear array.

Although the examples of crossed-beam beamformers described above have either two linear arrays or one linear array and one omni microphone, those skilled in the art will understand that crossed-beam beamformers can be implemented using other types of beamformers having other types of audio signal generators, including two- or three-dimensional microphone arrays, forming first-, second-, or higher-order directional beampatterns, as well as suitable signal processing other than filter-sum signal processing, such as, without limitation, minimum variance distortionless response (MVDR) signal processing, minimum mean square error (MMSE) signal processing, multiple sidelobe canceller (MSC) signal processing, and delay-sum (DS) signal processing, which is a subset of filter-sum beamformer signal processing.

Figure 4:
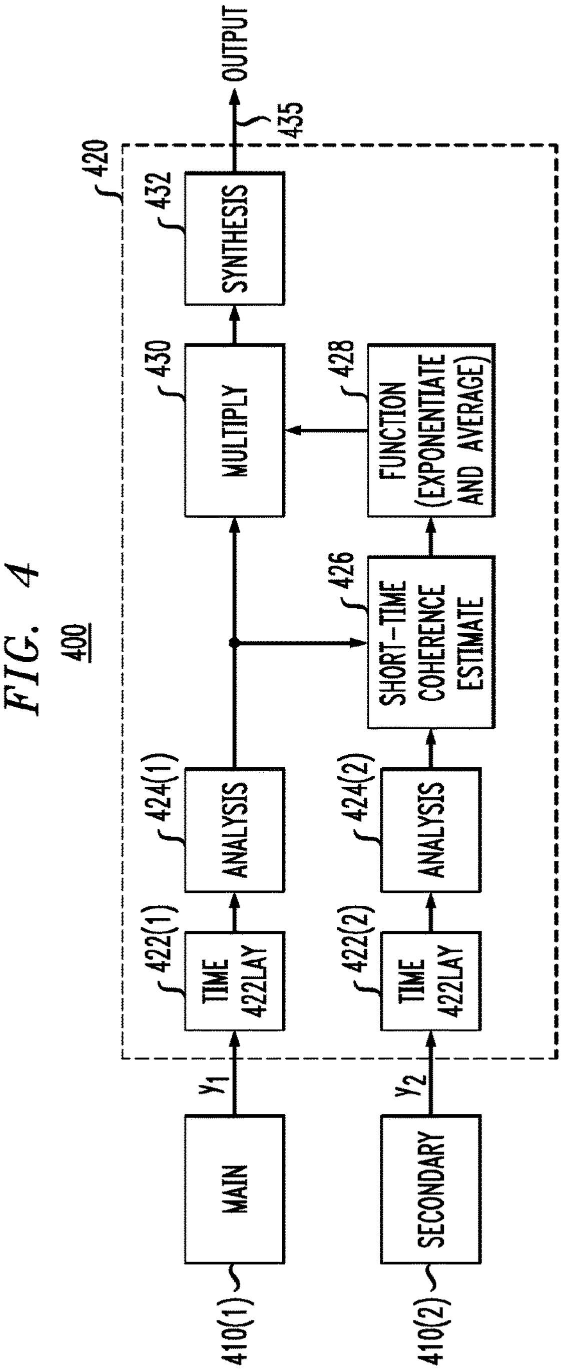
FIG. 4 is a block diagram of an example audio processing system designed to implement one embodiment of the crossed-beam reverberation suppression technique.

FIG. 4 is a block diagram of an example audio processing system 400 designed to implement one embodiment of the crossed-beam reverberation suppression technique. Audio processing system 400 comprises (i) two crossed-beam beamformers 410 (i.e., a main beamformer 410(1) and a secondary beamformer 410(2)) and (ii) a signal-processing subsystem 420 that performs short-term coherence-based signal processing on the audio signals $y_1$ and $y_2$ generated by those two beamformers 410 to generate a reverberation-suppressed, output audio signal 435.

As shown in FIG. 4, the signal-processing subsystem 420 has two, independently controllable time delays 422(1) and 422(2) for time alignment of the two input audio signals $y_1$ and $y_2$ to account for possible differences in the propagation times from the sound source to the outputs of the two beamformers 410. In the embodiment of FIG. 4, the short-time coherence estimates are generated in frequency subbands that allow for frequency-dependent reverberation suppression. As such, analysis blocks 424(1) and 424(2) transform the time-delayed audio signals from the time domain to the frequency domain. Similarly, synthesis block 432 transforms the signal-processed signals from the frequency domain back into the time domain to generate the output audio signal 435. Those skilled in the art will understand that the analysis and synthesis blocks can be implemented using conventional fast Fourier transforms (FFTs) or other suitable techniques, such as filter banks. In other possible embodiments of signal-processing subsystem 420, more or even all of the processing may be implemented in the time domain.

A good starting point in describing the crossed-beam reverberation suppression technique is an investigation into the effects of time delay on the coherence function estimate. The crossed-beam technique is based on two assumptions. First, long-term diffuse reverberation has a very low short-term coherence between minimally overlapping beams. Second, time-delay bias in the estimation of the short-time coherence function for diffuse reverberant environments can be exploited to reduce long-term reverberation. In room acoustics, the spatial cross-spectral density function $S_{12}(r, \omega)$ between two, spatially separated, omnidirectional microphones for a diffuse reverberant field, as determined at the location of the first beamformer, is the zero-order spherical Bessel function of the first kind given by Equation (3) as follows:

$$S_{12}(r,\omega) = \frac{N_o(\omega)}{4\pi}\int_0^{\pi}\int_0^{2\pi} e^{-jkr\cos\theta}\sin\theta d\theta d\phi = \frac{N_o(\omega)\sin(kr)}{kr}, \tag{3}$$

where r is the distance between the phase centers of the two microphones, $N_0(\omega)$ is the power spectral density assumed to be constant in the noise, ω is the sound frequency in radians/sec, k is the wavenumber, where k=ω/c and c is the speed of sound, and θ and Ø are the spherical angles from the microphone to the sound source in the microphone's coordinate system, where θ is the angle from the positive z-axis, and Ø is the azimuth angle from the positive x-axis in the x-y plane. Note that the diffuse assumption implies that, on average, the power spectral densities are the same at the two measurement locations. Those skilled in the art will understand that the spatial cross-spectral density function $S_{12}(r, \omega)$ is a coherence function.

The normalized, spatial magnitude-squared coherence (MSC) $\gamma_{12}^2(r, \omega)$ for the two beampatterns is defined as the squared spatial cross-spectral density divided by the two auto-spectral densities, which can be written according to Equation (4) as follows:

$$\gamma_{12}^2(r,\omega) = \frac{S_{12}(r,\omega)S_{12}^*(r,\omega)}{S_{11}(\omega)S_{22}(\omega)} = \frac{\sin^2(kr)}{(kr)^2} \tag{4}$$

where the * indicates the complex conjugate, and $S_{11}(\omega)$ and $S_{22}(\omega)$ are the auto-spectral densities for the two beampatterns.

Figure 5:
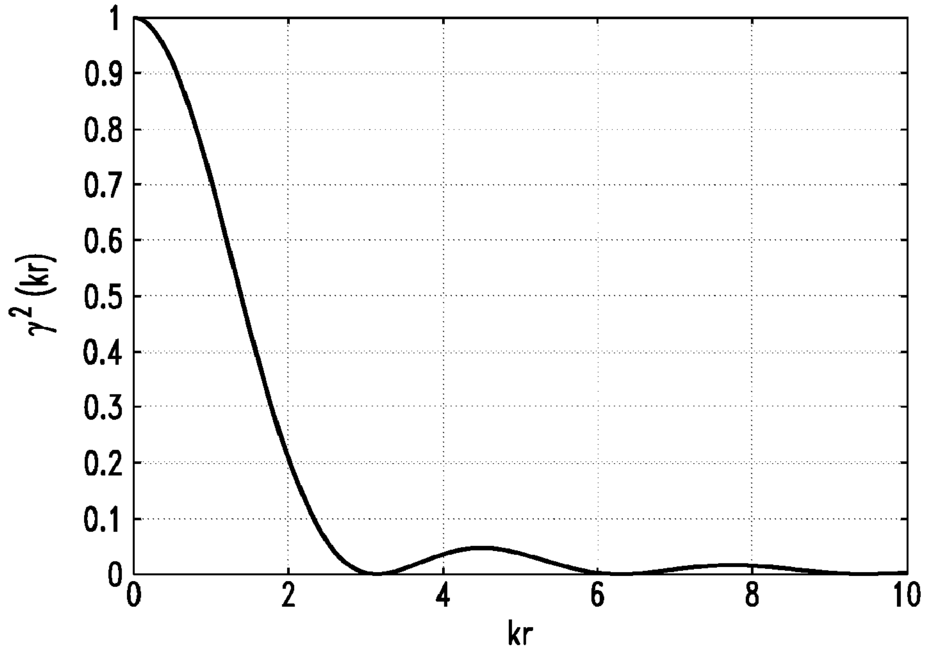
FIG. 5 is a graphical representation of the normalized, spatial magnitude-squared coherence (MSC) $\gamma_{12}^2(r, \omega)$ of Equation (4) as a function of the product kr of the frequency k and the spacing r.

FIG. 5 is a graphical representation of the normalized, spatial MSC $\gamma_{12}^2(r, \omega)$ of Equation (4) as a function of the product kr of the frequency k and the spacing r. As shown in FIG. 5, the normalized, spatial MSC is bounded between 0 and 1 such that $0 \le \gamma_{12}^2(r, \omega) \le 1$. As can be seen in FIG. 5, the spatial MSC falls rapidly as the product of the frequency and spacing increases. The function has a value of zero when kr=nπ, where n is any positive integer, i.e., when the spacing r between the two microphones is an integer multiple of one-half the acoustic wavelength λ such that r=nλ/2.

For two beamformers having different directivities, such as (i) two directional beamformers or (ii) a directional beamformer and an omnidirectional sensor, a more-general expression for the spatial MSC function $\gamma_{12}^2(r, \omega)$ can be written according to Equation (5) as follows:

$$\gamma_{12}^2(r,\omega) = \frac{E[D_1(\theta,\phi,\omega)D_2^*(\theta,\phi,\omega)e^{-jk\cdot r}]}{E[|D_1(\theta,\phi,\omega)|]E[|D_2(\theta,\phi,\omega)|]}, \tag{5}$$

where E[•] represents the expectation function, $D_1$ and $D_2$ are the spatial responses for the two beamformers, and k·r is a dot product between the wavevector k and the beamformer displacement vector r from the phase center of the audio signal generator of one beamformer to the phase center of the audio signal generator of the other beamformer. In general, using directional beamformers with smaller spatial overlap will result in a sharper roll-off in the MSC as the dimensionless product of frequency times spacing (kr) increases. The converse is also true in that using directional beamformers with significant spatial overlap will result in a relatively slow roll-off in the MSC as kr increases.

Figure 6:
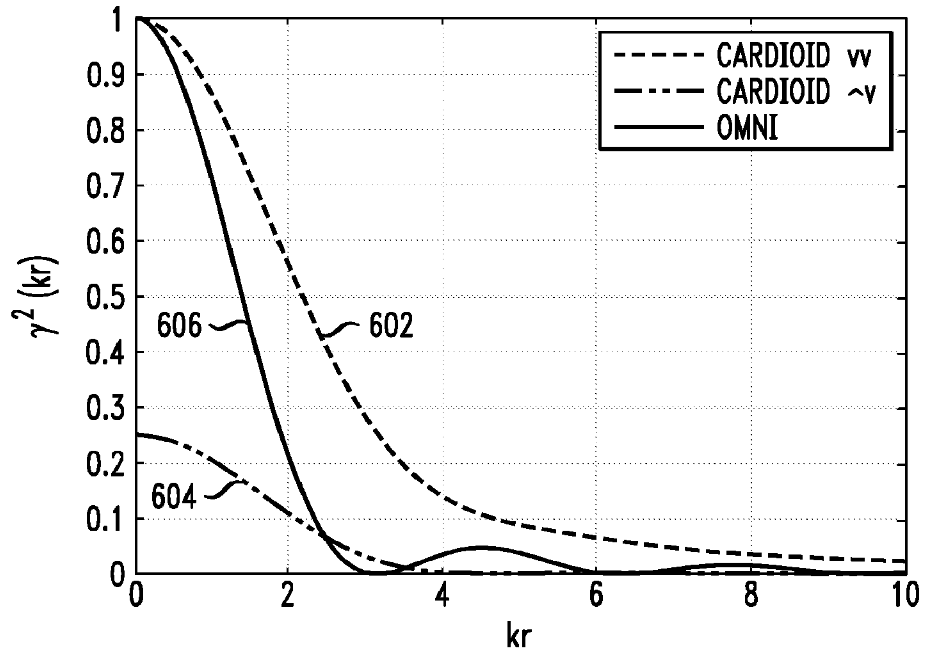
FIG. 6 is a graphical representation of the MSC for the two example pairs of first-order cardioid beampatterns shown in FIGS. 3A and 3B as a function of kr.

FIG. 6 is a graphical representation of the MSC for the two example pairs of first-order cardioid beampatterns 302 (1) and 302(2) shown in FIGS. 3A and 3B as a function of kr. For both the parallel configuration of FIG. 3A (i.e., the MSC 602 for the "vv" cardioid configuration in FIG. 6) and the anti-parallel configuration of FIG. 3B (i.e., the MSC 604 for the "^v" cardioid configuration in FIG. 6), the two cardioid microphones are placed along the x-axis separated by the distance r. For reference, the MSC 606 for two omnidirectional microphones is included in FIG. 6. As can be seen, the MSC 602 for the two cardioids pointing in the same direction has a slower decay (i.e., slower roll-off) as a function of kr than do two omnidirectional microphones. In general, the envelopes of these functions decrease as kr gets larger, even though some configurations decrease faster than others depending on the beamformer shape and orientation.

For each frequency band, short-time estimates $\hat{S}_{12}(\omega, T)$ of the coherence function $S_{12}(r, \omega)$ of Equation (3) can be generated using relatively short blocks of samples of duration T, and then expected values $E[\hat{S}_{12}(\omega, T)]$ can be generated from these short-time estimates. The expected values $E[\hat{S}_{12}(\omega, T)]$ can be written from the cross-spectral density function of Equation (3) according to Equation (6) as follows:

$$E[\hat{S}_{12}(\omega,T)] = \int_{-T}^{T} w(\tau)\left(1-\frac{|\tau|}{T}\right)R_{12}(\tau)e^{-j\omega\tau}d\tau, \tag{6}$$

where w(τ) is a window function of time τ, $R_{12}(\tau)$ is the cross-correlation function between the two beampatterns (and the Fourier transform of $S_{12}(r, \omega)$ of Equation (3)), τ is the general integration variable, and T is ½ the block size.

Similarly, the expected values $E[\hat{S}_{nn}(\omega, T)]$ for the estimated short-time auto-spectral density functions $\hat{S}_{nn}(\omega, T)$ can be written from the density function of Equation (3) according to Equation (7) as follows:

$$E[\hat{S}_{nn}(\omega,T)] = \int_{-T}^{T} w(\tau)\left(1-\frac{|\tau|}{T}\right)R_{nn}(\tau)e^{-j\omega\tau}d\tau, \tag{7}$$

where n=1, 2 indicates the beamformer number.

From these two equations, expected values $E[\hat{\gamma}_{12}^2(\omega, T)]$ of the short-time spatial MSC estimate $\hat{\gamma}_{12}^2(\omega, T)$ are given by Equation (8) as follows:

$$E[\hat{\gamma}_{12}^2(\omega, T)] = \frac{E[\hat{S}_{12}(\omega, T)\hat{S}_{21}(\omega, T)]}{E[\hat{S}_{11}(\omega, T)]E[\hat{S}_{22}(\omega, T)]}, \tag{8}$$

where $\gamma_{12}^2(r, \omega)$ in Equations (4) and (5) is the true spatial MSC value and $\hat{\gamma}_{12}^2(\omega, T)$ in Equation (8) is the short-time spatial MSC estimate.

The estimated magnitude-squared coherence $E[\hat{\gamma}_{12}^2(\omega, T)]$ between a random wide-sense-stationary (WSS) signal and the same signal delayed by $\tau_0$ can be written as a function of the real coherence for the signal according to Equation (9) as follows:

$$E[\hat{\gamma}_{12}^2(\omega, T)] = \frac{w^2(\tau_0)\left(1 - \frac{|\tau_0|}{T}\right)^2}{w^2(0)}\gamma_{12}^2(\omega) \tag{9}$$

where $\gamma_{12}^2(\omega)$ is the true magnitude-squared coherence function.

Figure 7:
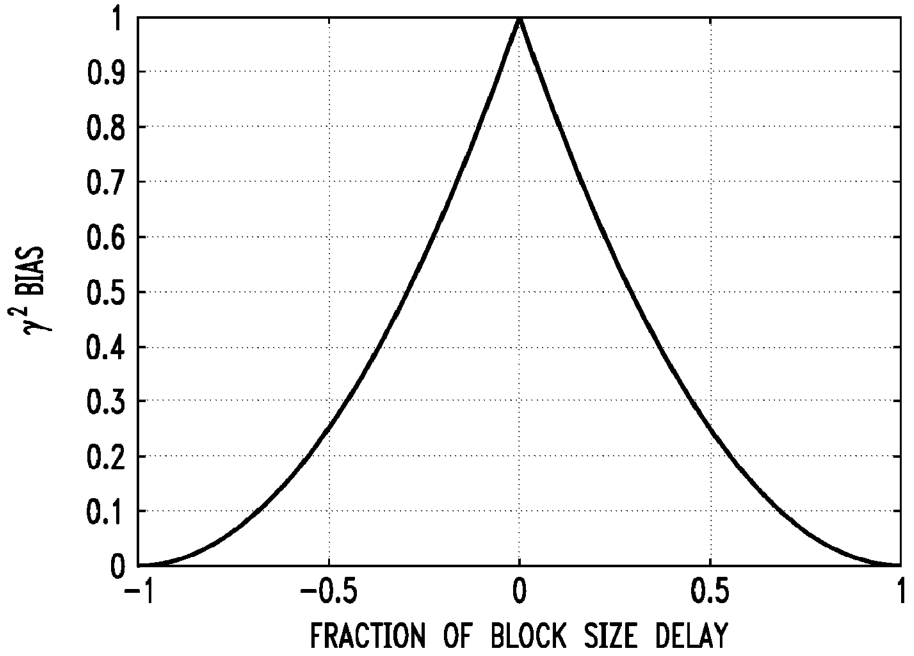
FIG. 7 is a graphical representation of the negative short-time estimation bias as a function of the delay relative to the overall processing block size.

FIG. 7 is a graphical representation of the negative short-time estimation bias as a function of the delay relative to the overall processing block size. It can be seen in Equation (9) that introducing a time delay between a random WSS signal and itself leads to a negative bias (i.e., a systematic underestimate) in the short-time estimate of the coherence. As can be seen in FIG. 7, as the magnitude of the time delay offset increases relative to the estimation time window, the estimated coherence is negatively biased and monotonically decreases for a random WSS signal. Thus, by using delay in one of the channels or having delay due to reverberation, the estimated coherence is reduced and can therefore be utilized to suppress later-arriving reverberation. This result also indicates that multiple beamformers should be time aligned for signals coming from the overlapping spatial region where the desired source is located.

From the above discussion, one could design a model of the source in a room reverberation that is divided into two regimes: (1) the direct field from the source and (2) a diffuse field due to longer-term reverberation. For two omnidirectional microphones with spacing d, the magnitude-squared coherence $\gamma_{12}^2(d, \omega)$ can be written according to Equation (10) as follows:

$$\gamma_{12}^2(d, \omega) = [1 + R(\omega)]^{-2}\left[\left\{R(\omega)\frac{\sin(kd)}{(kd)} + \cos(kd)\right\}^2 + \sin^2(kd)\right] \tag{10}$$

where $R(\omega)$ is the reverberant diffuse-to-direct power ratio.

The phase $\theta_{12}(\omega)$ between the microphones can be obtained by the phase of the cross-spectral density function of Equation (3) and is given by Equation (11) as follows:

$$\theta_{12}(\omega) = \tan^{-1}\left[\frac{\sin(kd)}{R(\omega)\frac{\sin(kd)}{(kd)} + \cos(kd)}\right]. \tag{11}$$

Figure 8:
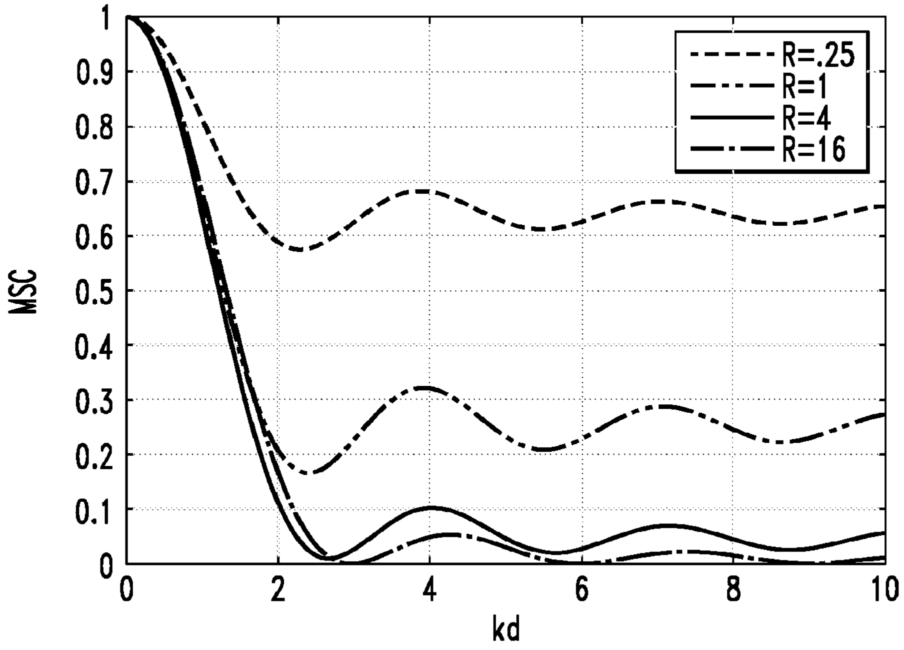
FIGS. 8 and 9 are graphical representations of the MSC $\gamma_{12}^2(d, \omega)$ of Equation (10) and the on-axis phase angle $\theta_{12}(\omega)$) of Equation (11), respectively, for spaced omnidirectional microphones for four different diffuse-to-direct power ratios $R(\omega)$ (i.e., 0.25, 1, 4, and 16) as a function of microphone spacing kd for an on-axis source.
Figure 9:
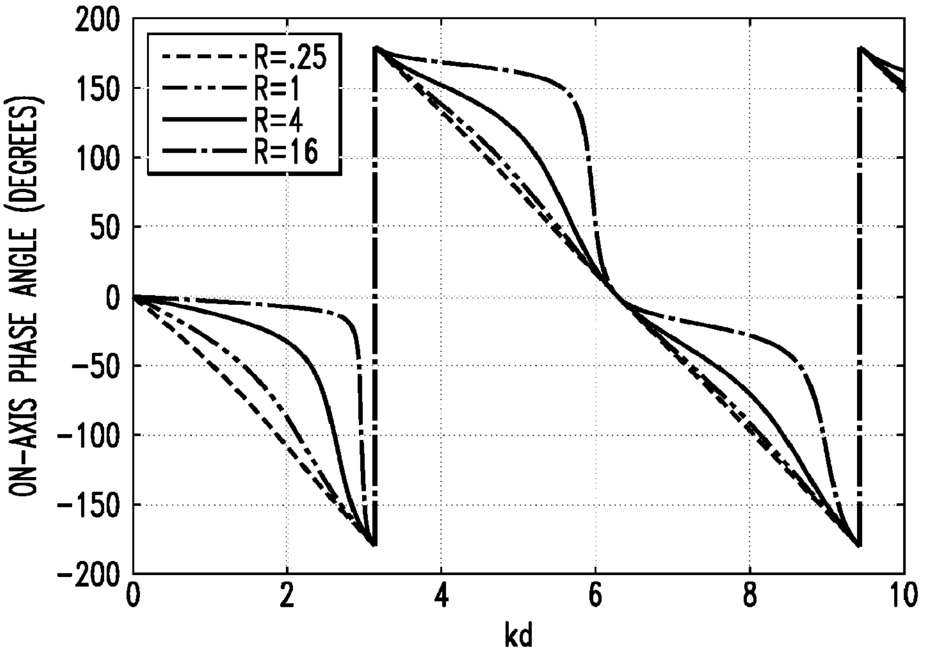

FIGS. 8 and 9 are graphical representations of the MSC $\gamma_{12}^2(d, \omega)$ of Equation (10) and the on-axis phase angle $\theta_{12}(\omega)$ of Equation (11), respectively, for spaced omnidirectional microphones for four different diffuse-to-direct power ratios $R(\omega)$ (i.e., 0.25, 1, 4, and 16) as a function of microphone spacing kd for an on-axis source. It can be seen in FIG. 8 that, as the ratio $R(\omega)$) gets smaller, the MSC heads to unity as expected. In FIG. 9, where the depicted phase is wrapped, it can be seen that the linear propagating phase dominates when the direct field is much larger than the diffuse field and converges to an oscillation in sign when the diffuse field component dominates. The oscillation of the phase occurs when there is a sign change in the diffuse-field cross-spectral density.

The MSC results shown in FIG. 8 are for spaced omnidirectional microphones. The MSC falls off rather quickly as the diffuse reverberant field becomes larger than the direct field. For instance, at the critical distance where $R(\omega)=1$, the value of the MSC is typically less than 0.3 when kd>2. However, there is more interest in reducing the detrimental effects of room reverberation when the reverberant field is much larger than the direct field. Unfortunately, for common cases of distant talking to a microphone, the value of $R(\omega)$ is greater than 1, and therefore the MSC is low and would be difficult to use in an algorithm that would not also suppress the desired direct field along with the undesired reverberant signal.

One way to overcome this problem is to use directional microphones with sufficient directional gain to alter the ratio of diffuse sound to direct sound so that the resulting ratio is less than or close to unity. The directivity factor Q of a beamforming microphone array is defined according to Equation (12) as follows:

$$Q(\omega, \theta_0, \phi_0) = \frac{|D(\omega, \theta_0, \phi_0)|^2}{\frac{1}{4\pi}\int_0^{2\pi}\int_0^{\pi}|D(\omega, \theta, \phi)|^2 u(\omega, \theta, \phi)\sin\theta d\theta d\phi} \tag{12}$$

where $\theta_0$ and $Ø_0$ are the spherical angles, u is the spatial distribution of the reverberant field (u=1 for a diffuse field), and D is the amplitude directional response of the beamformer. With this definition, a beamformer steered towards the desired source with a directivity factor of Q would result in a new diffuse-to-direct sound ratio $\hat{R}$ given by Equation (13) as follows:

$$\hat{R} = \frac{R}{Q} \tag{13}$$

The result given in Equation (13) can be used to determine the required directivity factor of a beamformer used in a room where the source distance from the beamformer's audio signal generator (e.g., a linear microphone array) and the room critical distance are known.

Another factor that comes into play in the design of an effective short-time coherence-based algorithm is the inherent random noise in the estimation of the short-time coherence function. Estimation noise comes from multiple sources: real uncorrelated noise in the measurement system as well as using a short-time estimator for the coherence function (which by definition is over an infinite time interval). The random error $\varepsilon[\gamma_{12}^2(\omega)]$ for estimating the short-time magnitude-squared coherence function can be given according to Equation (14) as follows:

$$\varepsilon[\hat{\gamma}_{12}^2(\omega)] = \frac{\sqrt{2}\,[1 - \gamma_{12}^2(\omega)]}{|\gamma_{12}(\omega)|\sqrt{N}} \tag{14}$$

where $\hat{\gamma}_{12}^2(\omega)$ is the estimated magnitude-squared coherence, $\gamma_{12}^2(\omega)$ is the true magnitude-squared coherence function, and N is the number of independent distinct averages that are used in the estimation. Thus, the variance in the magnitude-squared coherence estimate depends on the number of averages and decreases as the square root of the number of averages. In a practical digital signal processing implementation, the averaging of the coherence function is most likely implemented by a single-pole IIR (infinite impulse response) low-pass filter (or possibly a pair of single-pole low-pass filters: one for positive increase and one for a negative decay of the function) with a time constant that is between about 10 and about 50 milliseconds. For "fast" tracking of the time-varying coherence due to the nonstationary transient nature of speech and other similar transient-like signals, it is preferable to choose a lower time constant. However, rapid modification of the output by the time-varying coherence function can lead to undesirable signal distortion. Therefore, the time constant can be chosen to be where an expert listener would find the "best" trade-off between rapid convergence and suppression versus acceptable distortion to the desired signal.

As shown above, there are a couple of factors that can be exploited in using short-time coherence function processing for reverberation reduction: one being the spatial selectivity overlap between the beamformers and another being the addition of a windowing and delay function, or block windowing and delay compensation between the two beamformer outputs before estimating the short-term coherence function between the outputs. One could expand this development further to include more beamformers and utilize the partial coherence function estimation as a group of measures. The partial coherence functions could then be used in a processing scheme that aggregates all of the partial coherence function estimates to further reduce long-term uncorrelated reverberation between all the overlapping beamformer output channels.

Referring again to FIG. 4, for each frequency band, processing block 426 forms the short-time estimate of the coherence function as defined in Equation (8) for a block of input samples for the time-delayed main beampattern from analysis block 424(1) and the corresponding block of input samples for the time-delayed secondary beampattern from analysis block 424(2).

Processing block 428 filters the short-time coherence estimates from processing block 426 for temporally adjacent sample blocks to compute a smoothed average of the coherence estimates and applies an exponentiation of the smoothed estimates. In one possible implementation, the smoothed average $\gamma_s$ of the coherence estimates $\hat{\gamma}$ may be generated using a first-order (single-pole) recursive low-pass filter defined by Equation (14a) as follows:

$$\gamma_s(n+1)=\alpha*\hat{\gamma}(n)+(1-\alpha)\gamma_s(n), \tag{14a}$$

where $\alpha$ is the filter weighting factor between 0 and 1. These smoothed averages $\gamma_s$ may be exponentiated to some desired power using an exponent typically between 0.5 and 5. Alternatively, the coherence estimates $\hat{\gamma}$ may be exponentiated prior to filtering (i.e., averaging). In either case, the exponentiation allows one to increase (if the exponent is greater than 1) or decrease (if the exponent is less than 1) suppression in situations where the coherence is lower than 1.

Processing block 430 multiplies the frequency vector for the time-delayed main beampattern from block 424(1) by the exponentiated average coherence values computed in block 428 to generate a reverberation-suppressed version of the main beampattern in the frequency domain for application to synthesis block 432.

In alternative implementations, block 428 could employ an averaging filter having a faster attack and a slower decay. This could be implemented by selectively employing two different filters: a relatively fast filter having a relatively large value (closer to one) for the filter weighting factor $\alpha$ in Equation (14a) to be used when the coherence is increasing temporally and a relatively slow filter having a relatively small value (closer to zero) for the filter weighting factor $\alpha$ to be used when the coherence is decreasing temporally.

Disjoint-Beam Reverberation Suppression

The disjoint-beam reverberation suppression technique is based on the assumption that the long-term reverberation is similar for all beamformers in the same room. Although this assumption might not be valid in some atypical types of acoustic environments, in typical rooms, acoustic absorption is distributed along all the boundaries, and typical beamformers have only limited directional gain. Thus, the assumption that practical beamformers in the same room will have similar long-term reverberation is a reasonable assumption.

The basic arrangement for the disjoint-beam technique comprises a main, directional beamformer whose primary lobe is directed towards the desired source and a secondary, directional beamformer whose primary lobe is not directed towards the desired source. It is assumed that both beamformers have similar envelope-decay responses for long-term reverberation. With this assumption, it is possible to implement a long-term reverberation suppression scheme since the smoothed reverberant signal envelopes are similar.

Figure 10:
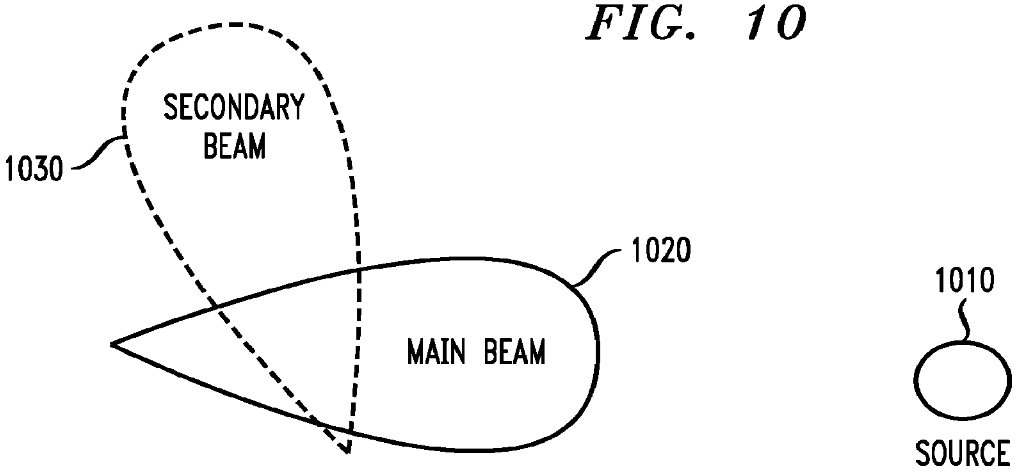
FIG. 10 represents one example of a disjoint-beam configuration, where the main beampattern is steered toward the desired source, while the secondary beampattern is steered away from the desired source.

FIG. 10 represents one example of a disjoint-beam configuration, where the main beampattern 1020 is steered toward the desired source 1010, while the secondary beampattern 1030 is steered away from the desired source. Note that it is not required to use the same beampattern or physically collocated beamformers.

For purposes of this specification, two beamformers are said to be disjoint beamformers if (i) the beampattern of one beamformer is directed towards the desired sound source such that the desired sound source is located within the primary lobe of that beampattern and (ii) the beampattern of the other beamformer is directed such that the desired sound source is either located outside of the primary lobe of that beampattern or at least at a location within the beam pattern's primary lobe that has a greatly attenuated response relative to the response at the middle of that primary lobe. Note that "directed away" does not necessarily mean in the direct opposite direction.

Similar to the case for the crossed-beam technique, the beamformers for the disjoint-beam technique can be any suitable types and configurations of directional beamformers, including two directional beamformers sharing a single linear microphone array as their audio signal generators, where different beamforming processing is performed to generate two different beampatterns from that same set of array audio signals: one beampattern directed towards the desired source and the other beampattern directed away from the desired source.

Figure 11:
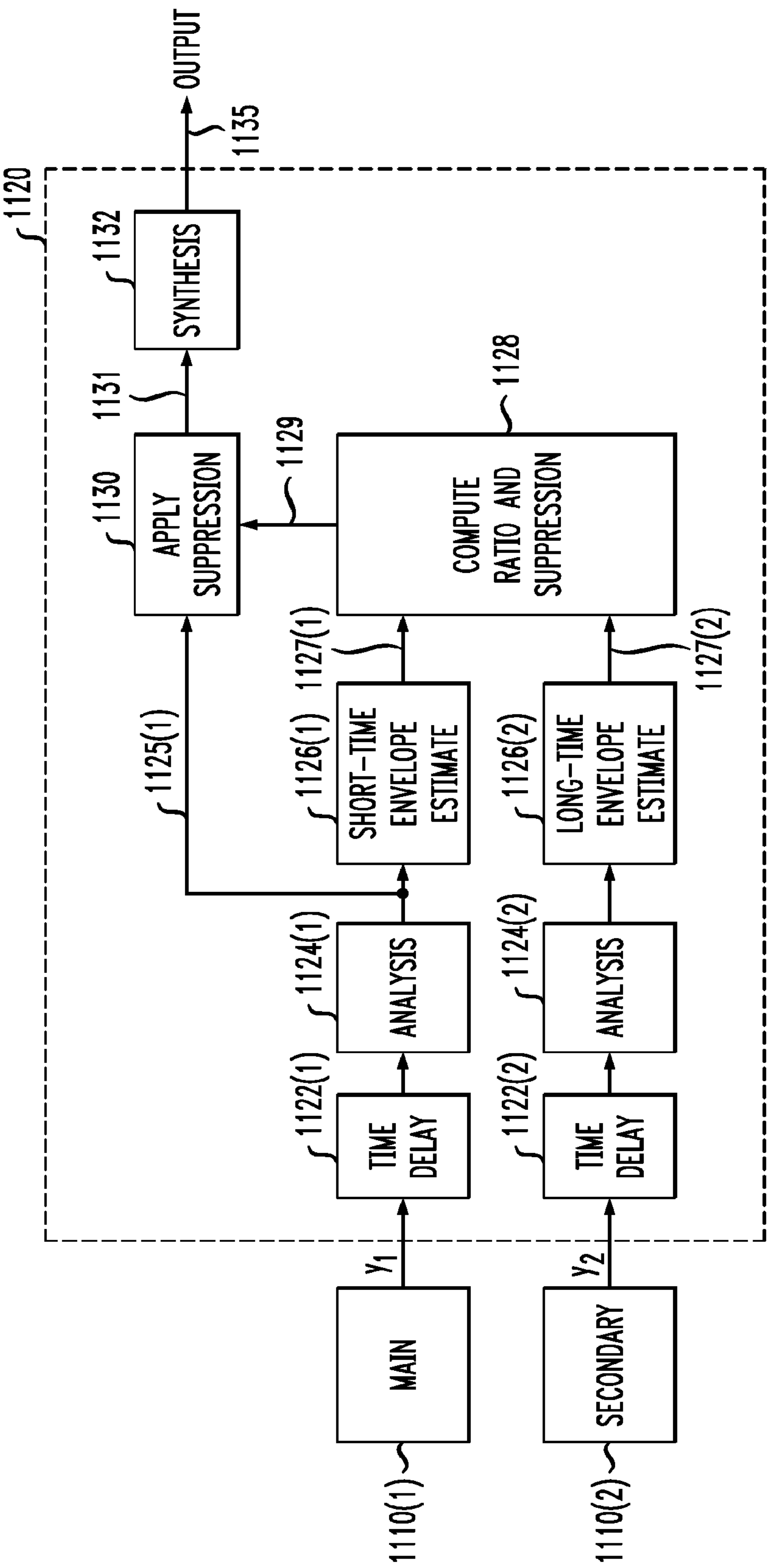
FIG. 11 is a block diagram of an example audio processing system designed to implement one embodiment of the disjoint-beam reverberation suppression technique.

FIG. 11 is a block diagram of an example audio processing system 1100 designed to implement one embodiment of the disjoint-beam reverberation suppression technique. Audio processing system 1100 comprises (i) two disjoint-beam beamformers 1110 (i.e., a main beamformer 1110(1) and a secondary beamformer 1110(2)) and (ii) a signal-processing subsystem 1120 that performs disjoint beamformer reverberation suppression signal processing on the audio signals $y_1$ and $y_2$ generated by those two beamformers 1110 to generate a reverberation-suppressed, output audio signal 1135. In system 1100, the beampattern of the main beamformer 1110(1) is directed towards the desired source, while the beampattern of the secondary beamformer 1110(2) directed away from the desired source.

Similar to the embodiment of FIG. 4, as shown in FIG. 11, the signal-processing subsystem 1120 has two, independently controllable time delays 1122(1) and 1122(2) for time alignment of the two input audio signals $y_1$ and $y_2$ to account for possible differences in the propagation times from the sound source to the two beamformers 1110. In the embodiment of FIG. 11, envelope estimates are generated in frequency subbands that allow for frequency-dependent reverberation suppression. As such, analysis blocks 1124(1) and 1124(2) transform the time-delayed audio signals from the time domain to the frequency domain. Similarly, synthesis block 1132 transforms the signal-processed signals from the frequency domain back into the time domain to generate the output audio signal 1135.

For each frequency band, processing block 1126(1) generates a short-time estimate 1127(1) of the envelope for the main beamformer, while processing block 1126(2) generates a long-time estimate 1127(2) of the envelope of the secondary beamformer. The short-time envelope estimate 1127(1) tracks the variations in the spectral energy of the direct-path acoustic signal (e.g., speech) in each frequency band, while the long-time envelope estimate 1127(2) tracks the spectral energy of the long-term diffuse reverberation in each frequency band. Processing block 1128 receives the short- and long-time envelope estimates 1127(1) and 1127(2) from processing blocks 1126(1) and 1126(2) and computes a suppression vector 1129 that suppresses the reverberant part of the signal from the main beamformer 1110(1).

Both the short- and long-time envelopes are computed using two-sided, single-pole linear recursive equations, in the following fashion. For each subband k and each processing time index m, the short-time estimated envelope $\overline{Y}_m$ for the main beam and the long-time estimated envelope $\overline{Y}_s$ for the secondary beam are given by Equations (15) and (16), respectively, as follows:

$$\overline{Y}_m(k,m)=\alpha\overline{Y}_m(k,m-1)+(1-\alpha)|Y_m(k,m)|, \tag{15}$$

$$\overline{Y}_s(k,m)=\beta\overline{Y}_s(k,m-1)+(1-\beta)|Y_s(k,m)|, \tag{16}$$

where $Y_m(k, m)$ and $Y_s(k, m)$ the overbar ($\overline{\phantom{x}}$) denotes an envelope, and α and β are parameters of the recursion whose values at any time m are chosen based on whether the instantaneous spectral magnitude is increasing or decreasing relative to the current envelope. Specifically, parameter α in Equation (15) is given by Equation (17) as follows:

$$\alpha=\begin{cases}\alpha_A, & \text{if } |Y_m(k,m)|\geq\overline{Y}_m(k,m-1)\\ \alpha_D, & \text{if } |Y_m(k,m)|<\overline{Y}_m(k,m-1)\end{cases}, \tag{17}$$

where $\alpha_A$ and $\alpha_D$ are the "attack" and "decay" constants. Parameter β in Equation (16) is defined similarly to Equation (17), but with $Y_s$ replacing $Y_m$, and $\beta_A$ and $\beta_D$ being the attack and decay constants.

The attack and decay constants are chosen to result in recursive envelope estimators whose time response is coincident with the underlying physical quantities being tracked. For the single-pole recursions in Equations (15) and (16), each attack constant and each decay constant is computed using Equation (18) as follows:

$$e^{-1/(t\, f_s)}, \tag{18}$$

where t is the desired time constant in seconds and $f_s$ is the sampling rate of frame processing. For Equation (15), nominal attack and decay time constants $\alpha_A$ and $\alpha_D$, using Equation (17), are t=1 msec and 25 msec, respectively. For Equation (16), nominal attack and decay time constants $\beta_A$ and $\beta_D$ are 100 msec and 500 msec, respectively. In Equation (18), the sampling rate of processing ($f_s$) is that at which the envelopes $\overline{Y}_m$ and $\overline{Y}_s$ are updated. This depends on the analysis-synthesis filterbank structure being used for the entire system. For example, if the input wideband sampling rate is 16,000 Hz, and the filterbank is designed to process 64 input samples each processing frame, then the sampling rate of update in Equations (15) and (16) would be 16000/80, or 250 Hz.

Processing block 1130 applies the suppression vector 1129 from processing block 1128 to suppress reverberation in the beampattern for the main beamformer 1110(1). In particular, processing block 1130 multiplies the frequency vector 1125(1) for the time-delayed main beampattern from block 1124(1) by the computed suppression values 1129 from block 1128 to generate a reverberation-suppressed version 1131 of the main beampattern in the frequency domain for application to synthesis block 1132.

Specifically, the envelope estimates $\overline{Y}_m$ and $\overline{Y}_s$ in Equations (15) and (16) are used to compute a gain function that incorporates a type of direct-path speech activity likelihood function. This function consists of the a posteriori reverberation-to-direct-speech ratio (RSR) normalized by the threshold γ of speech activity detection. Specifically, reverberation reduction is achieved by multiplying the spectral vector 1125(1) of the main beamformer 1110(1) by a reverberation suppression filter H(k, m) according to Equation (19) as follows:

$$\hat{S}(k,m)=H(k,m)Y_m(k,m), \tag{19}$$

where $\hat{S}(k, m)$ is the reverberation-reduced spectral output vector 1131, and the filter H(k, m) is given by Equation (20) as follows:

$$H(k,m)=\min\left[1,\left(\frac{\overline{Y}_m(k,m)}{\gamma\overline{Y}_s(k,m)}\right)^p\right], \tag{20}$$

where the threshold γ specifies the a posteriori RSR level at which the certainty of direct-path speech is declared, and p, a positive integer, is the gain expansion factor. Typical values for the detection threshold γ fall in the range 5≤γ≤20, although the (subjectively) best value depends on the characteristics of the filter bank architecture, the time constants used to compute the envelope estimates, and the reverberation characteristics of the acoustical environment in which the system is being used, among other things. The expansion factor p controls the rate of decay of the gain function for a posteriori RSR values below unity. With p=1, for example, the gain decays linearly with a posteriori RSR. Factor p also governs the amount of reverberation reduction possible by controlling the lower bound of Equation (20); larger p results in a smaller lower bound. The minimum operator min(.) insures that the filter H(k, m) reaches a value no greater than unity. Note that the threshold γ is different from the γ parameter used previously for coherence.

Although the generation of the suppression factors 1129 has been described in the context of the processing represented in Equation (20) in which averages of the short-time and long-time envelope estimates are first generated, then a ratio of the two averages is generated, and then the ratio is exponentiated, it will be understood that, in alternative implementations, the suppression factors 1129 can be generated using other suitable orders of averaging, ratioing, and exponentiating.

Those skilled in the art will recognize the similarity of the reverberation-suppression gain function of Equation (20) and the envelopes of Equations (15) and (16) to those used for the purposes of noise reduction in speech communications, as described in References [1] and [2] and whose fundamental theoretic foundations lie in seminal work in speech processing of the last century. See References [3] and [4].

Those skilled in the art of noise reduction will recognize many variations of the above technique. For example, the envelope estimates above may be replaced by any means of envelope estimation, such as moving average or statistical model-based estimation methods. The reverberation-suppression gain function in Equation (20) is one of many forms that have been devised over the last three decades for noise suppression, some of which are reviewed in References [1] and [5].

References (the teachings of each of which are incorporated herein by reference in their entirety):

[1] E. J. Diethorn, "Subband noise reduction methods for speech enhancement," in *Acoustic Signal Processing for Telecommunication*, S. L. Gay and J. Benesty, Eds. Norwell, Mass.: Kluwer, 2000, pp. 155-178.

[2] S. F. Boll, "Suppression of Acoustic Noise in Speech Using Spectral Subtraction," *IEEE Trans. Acoust., Speech, Signal Proc*., Vol. ASSP-27, No. 2, April 1979.

[3] M. R. Schroeder, U.S. Pat. No. 3,180,936.

[4] M. R. Schroeder, U.S. Pat. No. 3,403,224.

[5] E. J. Diethorn, "Foundations of spectral-gain formulae for speech noise reduction," in *Proc. International Workshop on Acoustic Echo and Noise Control* (*IWAENC*), 2005, pp. 181-184.

Variations on the aforementioned disjoint-beam reverberation suppression technique include the use of a look-up table to replace the function of block 1128. The table would contain discrete values of the reverberation function in Equation (20) evaluated at discrete combinations of inputs 1127(1) and 1127(2) to block 1128. In another variation, reverberation suppression block 1130, which applies a frequency-wise gain function at each processing time m, could be transformed in an additional step to an equivalent function of system input time t and applied directly to the wideband time-domain main beamformer signal $y_1$. In yet another variation, the entire secondary beamformer path of blocks 1122(2), 1124(2), and 1126(2) could be approximated by an estimate of the long-time reverberation derived directly from the main beamformer 1110(1) by, for example, directing the output of block 1124(1) to the input of block 1126(2) and modifying the time constants used in block 1126(2). Such a reduced-complexity reverberation suppressor would apply to implementations in which only a single beamformer, the main beamformer, is available.

Embodiments of the invention may be implemented using (analog, digital, or a hybrid of both analog and digital) circuit-based processes, including possible implementation using a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in a machine including, for example, a digital signal processor, micro-controller, general-purpose computer, or other processor.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular machine, feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A machine-implemented method for reducing reverberation in an audio signal, the method comprising:

(a) the machine generating a main audio signal having a main beampattern;

(b) the machine generating a secondary audio signal having a secondary beampattern, wherein the main beampattern is directed towards a desired sound source and the secondary beampattern is directed away from the desired sound source;

(c) the machine processing the main and secondary audio signals to generate suppression factors corresponding to the reverberation, wherein step (c) comprises:

(c1) the machine generating a short-time envelope estimate of the envelope of the main audio signal;

(c2) the machine generating a long-time envelope estimate of the envelope of the secondary audio signal; and (c3) the machine generating the suppression factors from the short-time and long-time envelope estimates; and (d) the machine applying the suppression factors to the main audio signal to reduce the reverberation in the main audio signal, wherein the short-time envelope estimates $\bar{Y}_m$ and long-time envelope estimates $\bar{Y}_s$ are generated by the machine using:

$$\bar{Y}_m(k,m)=\alpha\bar{Y}_m(k,m-1)+(1-\alpha)|Y_m(k,m)|$$

and $$\bar{Y}_s(k,m)=\beta\bar{Y}_s(k,m-1)+(1-\beta)|Y_s(k,m)|$$

where $Y_m$(k, m) and $Y_s$(k, m) are frequency-domain values of the main and secondary audio signals at frequency subband k and time index m, the overbar ($\overline{\ \ }$) denotes an envelope, and $\alpha$ and $\beta$ are specified recursion parameters, wherein $\alpha$ is less than $\beta$.

2. The method of claim 1, wherein:

step (a) comprises the machine generating the main audio signal using a main beamformer; and step (b) comprises the machine generating the secondary audio signal using a secondary beamformer.

3. The method of claim 2, wherein the main and secondary beamformers are not co-located.

4. The method of claim 2, wherein the main and secondary beamformers are co-located.

5. The method of claim 1, wherein each of the recursion parameters $\alpha$ and $\beta$ varies depending on whether a corresponding instantaneous spectral magnitude is increasing or decreasing relative to a corresponding current envelope.

6. An audio processing system for reducing reverberation in an audio signal, the system comprising:

a main beamformer that generates a main audio signal having a main beampattern;

a secondary beamformer that generates a secondary audio signal having a secondary beampattern, wherein the main beampattern is directed towards a desired sound source and the secondary beampattern is directed away from the desired sound source; and a signal-processing subsystem that (i) processes the main and secondary audio signals to generate suppression factors corresponding to the reverberation and (ii) applies the suppression factors to the main audio signal to reduce the reverberation in the main audio signal, wherein the subsystem:

(1) generates a short-time envelope estimate for the main audio signal;

(2) generates a long-time envelope estimate for the secondary audio signal; and (3) generates the suppression factors from the short-time and long-time envelope estimates, wherein the subsystem generates the short-time envelope estimates $\bar{Y}_m$ and long-time envelope estimates $\bar{Y}_s$ by using:

$$\bar{Y}_m(k,m)=\alpha\bar{Y}_m(k,m-1)+(1-\alpha)|Y_m(k,m)|$$

and $$\bar{Y}_s(k,m)=\beta\bar{Y}_s(k,m-1)+(1-\beta)|Y_s(k,m)|$$

where $Y_m$(k,m) and $Y_s$(k,m) are frequency-domain values of the main and secondary audio signals at frequency subband k and time index m, the overbar ($\overline{\ \ }$) denotes an envelope, and $\alpha$ and $\beta$ are specified recursion parameters, wherein $\alpha$ is less than $\beta$.

7. The system of claim 6, wherein the main and secondary beamformers are not co-located.

8. The system of claim 6, wherein the main and secondary beamformers are co-located.

9. The system of claim 6, wherein each of the recursion parameters $\alpha$ and $\beta$ varies depending on whether a corresponding instantaneous spectral magnitude is increasing or decreasing relative to a corresponding current envelope.

* * * * *